United States Patent
Chen et al.

(10) Patent No.: US 12,511,527 B2
(45) Date of Patent: Dec. 30, 2025

(54) VCSEL-BASED COHERENT SCALABLE DEEP LEARNING

(71) Applicants: Massachusetts Institute of Technology, Cambridge, MA (US); NTT Research, Incorporated, Sunnyvale, CA (US)

(72) Inventors: Zaijun Chen, Los Angeles, CA (US); Ryan Hamerly, Cambridge, MA (US); Dirk Robert Englund, Brookline, MA (US)

(73) Assignees: Massachusetts Institute of Technology, Cambridge, MA (US); NTT Research, Incorporated, Sunnyvale, CA (US)

( * ) Notice: Subject to any disclaimer, the term of this patent is extended or adjusted under 35 U.S.C. 154(b) by 0 days.

(21) Appl. No.: 18/863,245

(22) PCT Filed: May 15, 2023

(86) PCT No.: PCT/US2023/067003
§ 371 (c)(1),
(2) Date: Nov. 5, 2024

(87) PCT Pub. No.: WO2024/030690
PCT Pub. Date: Feb. 8, 2024

(65) Prior Publication Data
US 2025/0111218 A1    Apr. 3, 2025

Related U.S. Application Data

(60) Provisional application No. 63/341,601, filed on May 13, 2022.

(51) Int. Cl.
G06N 3/067    (2006.01)
G02F 1/21    (2006.01)
(Continued)

(52) U.S. Cl.
CPC ............. *G06N 3/067* (2013.01); *G02F 1/212* (2021.01); *G02F 1/3515* (2013.01); *G06E 3/008* (2013.01)

(58) Field of Classification Search
CPC ....... G06N 3/067; G02F 1/212; G02F 1/3515; G06E 3/008
See application file for complete search history.

(56) References Cited

U.S. PATENT DOCUMENTS

| | | | |
|---|---|---|---|
| 5,799,030 A * | 8/1998 | Brenner | H01S 5/18308 372/50.21 |
| 2020/0234100 A1 * | 7/2020 | Ramanan | G06F 17/142 |

(Continued)

OTHER PUBLICATIONS

S. P. Bhooplapur, A. Klee and P. J. Delfyett, "Line-by-Line Pulse-Shaping at GHz Modulation Frequencies With an Injection-Locked VCSEL Array," in IEEE Photonics Technology Letters, vol. 29, No. 15, pp. 1241-1244, 1 Aug. 1, 2017, doi: 10.1109/LPT.2017.2707490 (Year: 2017).*

(Continued)

*Primary Examiner* — James D. Rutten
(74) *Attorney, Agent, or Firm* — Smith Baluch LLP

(57) ABSTRACT

The exponential growth in deep learning models is challenging existing computing hardware. Optical neural networks (ONNs) accelerate machine learning tasks with potentially ultrahigh bandwidth and nearly no loss in data movement. Scaling up ONNs involves improving scalability, energy efficiency, compute density, and inline nonlinearity. However, realizing all these criteria remains an unsolved challenge. Here, we demonstrate a three-dimensional spatial time-multiplexed ONN architecture based on dense arrays of microscale vertical cavity surface emitting lasers (VCSELs). The VCSELs, coherently injection-locked to a leader laser, operate at gigahertz data rates with a 7T-phase-shift voltage on the 10-millivolt level. Optical (Continued)

nonlinearity is incorporated into the ONN with no added energy cost using coherent detection of optical interference between VCSELs.

17 Claims, 12 Drawing Sheets

(51) Int. Cl.
 *G02F 1/35* (2006.01)
 *G06E 3/00* (2006.01)

(56) References Cited

U.S. PATENT DOCUMENTS

| | | |
|---|---|---|
| 2021/0201126 A1 | 7/2021 | Meng et al. |
| 2021/0336414 A1 | 10/2021 | Harris |
| 2022/0044100 A1* | 2/2022 | Yoo .................. G06N 3/063 |

OTHER PUBLICATIONS

X. Porte, A. Skalli, N. Haghighi, S. Reitzenstein, J. A. Lott and D. Brunner, "Neural network computing using a large-area VCSEL," 2021 27th International Semiconductor Laser Conference (ISLC), Potsdam, Germany, 2021, pp. 1-2, doi: 10.1109/ISLC51662.2021.9615664. (Year: 2021).*

Nazanin Hoghooghi, Ibrahim Ozdur, Mehmetcan Akbulut, Josue Davila-Rodriguez, and Peter J. Delfyett, "Resonant cavity linear interferometric intensity modulator," Opt. Lett. 35, 1218-1220 (2010) (Year: 2010).*

Bernstein, et al. "Freely scalable and reconfigurable optical hardware for deep learning." Scientific Reports 11.1 (2021): 3144, 12 pages.

Chen et al., "Coherent optical neural network with injection-locked VCSELs." CLEO: Science and Innovations. Optica Publishing Group, 2022, 2 pages.

Chen et al., "Deep learning with Coherent VCSEL neural network," arXiv:2207.05329, Jul. 12, 2022, 27 pages.

Feldmann et al., "Parallel convolutional processing using an integrated photonic tensor core." Nature 589.7840 (2021):52-58, 10 pages.

Haglund, et al. "30 GHz bandwidth 850 nm VCSEL with sub-100 fJ/bit energy dissipation at 25-50 Gbit/s." Electronics Letters 51.14 (2015): 1096-1098.

Hamerly et al. "Large-scale optical neural networks based on photoelectric multiplication." Physical Review X 9.2 (2019): 021032, 12 pages.

Heuser, et al. "Developing a photonic hardware platform for brain-inspired computing based on 5x 5 VCSEL arrays." Journal of Physics: Photonics 2.4 (2020): 044002, 11 pages.

Heuser, et al. "Development of highly homogenous quantum dot micropillar arrays for optical reservoir computing." IEEE Journal of Selected Topics in Quantum Electronics 26.1 (2019): 1-9.

International Search Report and Written Opinion in International App. No. PCT/US2023/067003 mailed Mar. 12, 2024, 17 pages.

Li et al. "The challenges of modem computing and new opportunities for optics" SpringerOpen. Sep. 9, 2021 retrieved on [Jan. 24, 2024]. Retrieved from the internet entire document, 31 pages.

Lin et al., "All-optical machine learning using diffractive deep neural networks." Science 361.6406 (2018): 1004-1008.

Miller, "Attojoule optoelectronics for low-energy information processing and communications." Journal of Lightwave Technology 35.3 (2017): 346-396, 51 pages.

Shen et al., "Deep learning with coherent nanophotonic circuits." Nature Photonics 11.7 (2017): 441-446.

Sludds et al. Delocalized Photonic Deep Learning on the Internet's Edge, arXiv:2203.05466v2, Apr. 1, 2022, 46 pages.

Sludds et al., "Wavelength Multiplexed Ultralow-Power Photonic Edge Computing" arXiv:2203.05466, Mar. 10, 2022, 46 pages.

Tait et al., "Neuromorphic photonic networks using silicon photonic weight banks." Scientific Reports 7.1 (2017): 7430, 10 pages.

Wang, et al. "Integrated lithium niobate electro-optic modulators operating at CMOS-compatible voltages." Nature 562.7725 (2018): 101-104, 12 pages.

Wetzstein et al. "Inference in artificial intelligence with deep optics and photonics." Nature 588.7836 (2020): 39-47, 9 pages.

Wu et al. "Programmable phase-change metasurfaces on waveguides for multimode photonic convolutional neural network." Nature Communications 12.1 (2021): 96, 8 pages.

Xiao, "Silicon Photonic Switching Fabrics and Synaptic Interconnections for High Performance Computing and Neuromorphic Computing Systems". Proquest. Dec. 31, 2021. retrieved on [Jan. 24, 2024]. Retrieved from the internet entire document, 34 pages.

Xu et al., "11 TOPS photonic convolutional accelerator for optical neural networks." Nature 589.7840 (2021): 44-51.

* cited by examiner

Waveguide-based injection locking:

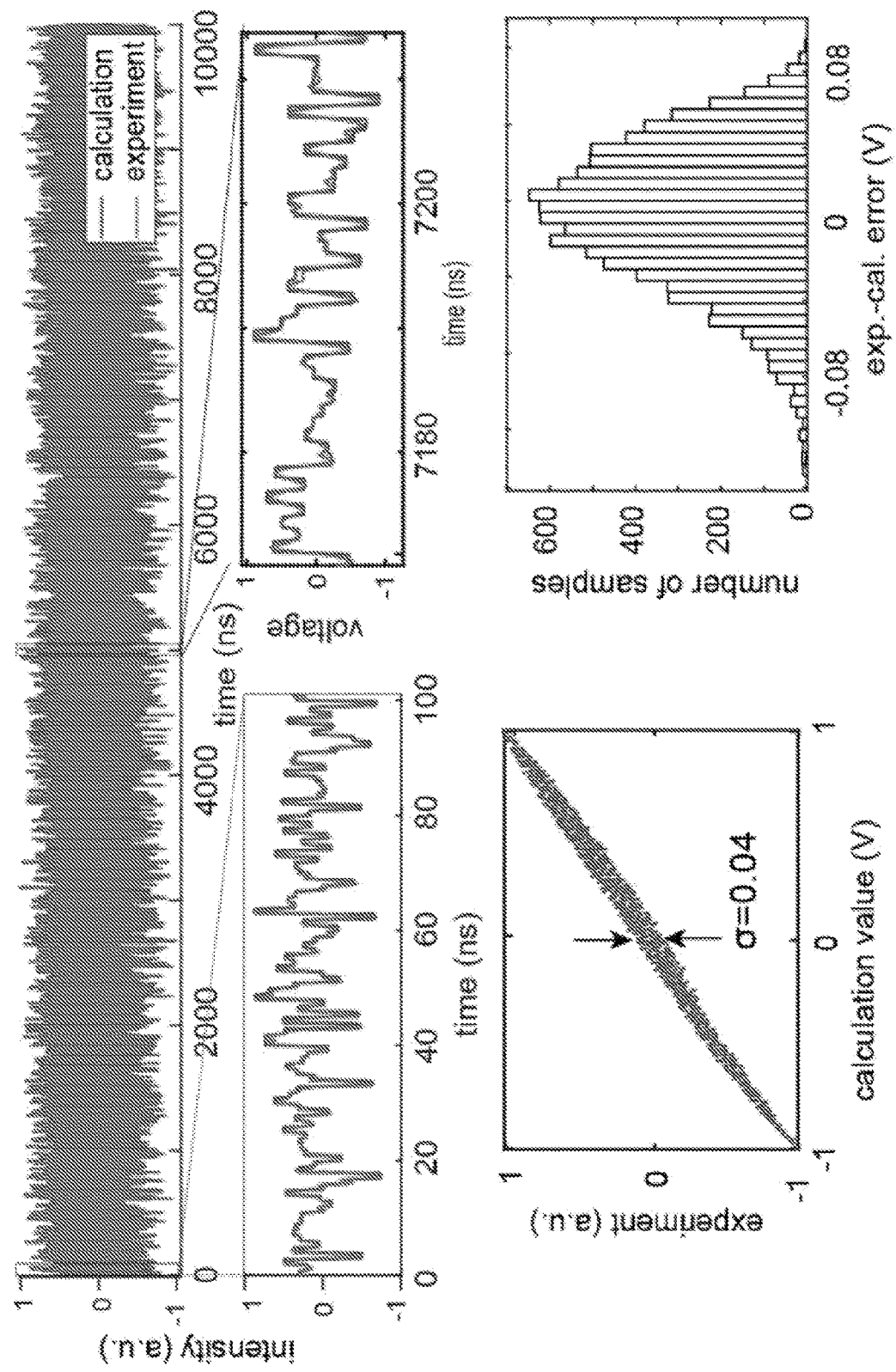

Accuracy: 93.1% over 1000 images
Total number of operations: 176,800,000

VCSEL-BASED COHERENT SCALABLE DEEP LEARNING

CROSS-REFERENCE TO RELATED APPLICATION(S)

This application is a national-stage application, under 35 U.S.C. 371, of International Application No. PCT/US2023/067003, filed on May 15, 2023, which claims the priority benefit, under 35 U.S.C. 119(e), of U.S. Application No. 63/341,601, filed on May 13, 2022. Each of these applications is incorporated herein by reference in its entirety for all purposes.

GOVERNMENT SUPPORT

This invention was made with government support under W911NF-17-1-0527 awarded by the Army Research Office. The government has certain rights in the invention.

BACKGROUND

Artificial neural networks are computational systems that imitate the way biological brains process information. These systems are built to learn, combine, and summarize information from large data sets. A deep neural network (DNN) is an artificial neural network with multiple layers between its input and output. Each layer performs a matrix-vector multiplication and a nonlinear activation. Due to both advances in DNN processes and increases in computing power, DNNs have revolutionized information processing in applications including image, object, and speech recognition; game playing; medicine; and physical chemistry.

Driven by the desire to tackle problems of increasing complexity, the size of DNNs and other machine learning models is increasing exponentially, with some reaching more than 100 billion trainable parameters. In contrast, due to the practical limits on transistor counts and energy consumption in data movement, extending computational capacity with complementary-metal-oxide-semiconductor (CMOS) neural network accelerators has become more and more difficult. An alternative approach leveraging qualitatively different technology must be developed to continue the scaling of computing power in coming decades.

SUMMARY

Generally, a neural network accelerator or other computation machine that implements a DNN or other artificial neural network should meet the following five criteria: high compute density (C1), low energy consumption (C2), inline nonlinearity (C3), and scalable hardware (C4) that can accommodate a large number of neurons (C5). State-of-the-art microprocessors, such as graphics processing units (GPUs) and application-specific integrated circuits (ASICs), are optimized for tensor processing tasks with (C1) compute density reaching $\rho=0.1$ TOPS/(mm$^2$·s) and (C2) energy cost $\epsilon \approx 1$ pJ/OPS, limited by the wire capacitance of electronic interconnects. Other major energy costs of these CMOS-based systems originate from data movement in interconnects, which acts as a computational bottleneck for artificial neural networks.

Optical neural networks (ONNs) hold much promise to alleviate these data movement bottlenecks with potentially orders of magnitude improvement owing to their large optical bandwidths and ability to move data with low loss. Recent progress in ONNs has yielded neural connectivity with photonic integrated circuits and 3D-printed phase masks, matrix multiplication in light-starved conditions, and high throughput with frequency multiplexing. However, achieving high data density with dense devices at low energy consumption remains challenging. It can also be challenging to perform a nonlinear activation function, which is chosen dependent on specific tasks to be performed by that neural network, in the optical domain at low light intensities due to the weakness of typical optical nonlinearities.

Inspired by the axon-synapses-dendrite architecture of biological neural systems, we introduce an DNN architecture that achieves the criteria C1-C5 in a three-dimensional architecture, using (i) coherent on-chip microscale laser transmitters as high-speed (e.g., GHz speed) 'laser axons,' (ii) coherent detection for weighted accumulation as low-energy 'laser synapses,' and (iii) holographic data movement as optical dendrite fanout. Based on an array of semiconductor vertical-cavity, surface-emitting lasers (VCSELs) as 'axon-synapse-dendrite' microscale transceivers, this coherent DNN, also called a VCSEL ONN, achieves (C1) best-in-class compute density, exceeding $10^{15}$ MAC/(s·cm$^2$); (C2) energy efficiency better than 1 fJ/MAC (approaching zJ/MAC with emerging analog-to-digital conversion (ADC) technology); and (C3) detection-based inline nonlinearity at greater than GHz bandwidths and negligible energy consumption:

TABLE 1

| Criterion | Description | VCSEL ONN |
|---|---|---|
| C1 | compute density ρ | 10 TOPS/(mm$^2$ · s) |
| C2 | energy consumption ϵ | 1 fJ/OPS |
| C3 | inline nonlinearity | coherent detection |
| C4 | hardware scalability | wafer-scale fabrication |
| C5 | number of neurons | freely scalable |

An example ONN can include an input layer to receive an input, multiple fully connected layers to perform inference processing on the input, and an output layer to return an output of the inference processing. Each fully connected layer can include an array of VCSELs in optical communication with a diffractive optical element (DOE) and an array of photodetectors. In operation, a first VCSEL in the array of VCSELs emits a first beam modulated with an input vector. The other (second) VCSELs in the array of VCSELs emit second beams that are modulated with weights of the optical neural network and coherent with the first beam. The DOE fans out the first beam, and the array of photodetectors detects interference between respective fanned-out copies of the first beam from the DOE and the second beams. The array of photodetectors can generate photocurrents proportional to $$\sum_{i=1}^{k} A_W A_X \sin(\phi_W - \phi_X),$$

where $A_X$ and $\phi_X$ are the amplitude and phase, respectively, of the first beam and $A_w$ and $\phi_W$ are the Amplitude and Phase, Respectively, of the $j^{th}$ Second Beam.

The optical neural network can have a compute density of at least 10 TOPS/(mm$^2$·s) and/or operate at an energy consumption of 1 fJ/OPS. The array of VCSELs can be monolithically integrated with the DOE and the array of photodetectors. The array of VCSELs can be modulated with a half-wave voltage of less than about 10 mV and/or at a modulation rate of at least 1 Gb/s. The array of VCSELs can also be injection-locked to a leader laser. The optical neural network may also include a second diffractive optical element, in optical communication with at least one of the second VCSELs in the array of VCSELs, to fan out the second beam emitted by that second VCSEL.

The array of photodetectors can be configured to generate outputs proportional to $$\sum_{t=1}^{k} A_{W,k} A_X \sin(\phi_{W,k} - \phi_X),$$

where $A_X$ and $\phi_X$ are the amplitude and phase, respectively, of the first beam and $A_{W,j}$ and $\phi_{W,j}$ are the amplitude and phase, respectively, of the $j_{th}$ second beam. The array of photodetectors can also be configured to generate outputs proportional to $$\sum_{t=1}^{k} \left[ W_j^i \sqrt{1 - (X^i)^2} - X^i \sqrt{1 - (W_j^i)^2} \right],$$

where $X^i$ represents the $i^{th}$ element of the activation vector and $W_j^i$ represents the $ij_{th}$ element of the weight matrix.

Such an optical neural network can perform inference processing by modulating a phase of a first beam emitted by a first VCSEL in an array of VCSELs with an activation vector to an optical neural network. The phases of second beams emitted by second VCSELs in the array of VCSELs can be modulated with respective elements of a weight matrix of the optical neural network. A diffractive optical element or other optical component fans out copies of the first beam to respective homodyne receivers, which detect homodyne interference of the copies of the first beam and respective second beams.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

FIG. 1A illustrates an implementation of an n-layer optical neural network (ONN; top) with a tensor core that can be implemented as a phase-encoding optical tensor core and a detailed illustration of the $i^{th}$ layer of the ONN (bottom). The input optical field, with the input vector X encoded in its amplitude or phase, is fanned out to j copies, each of which interferes with a corresponding weight field on a photodetector.

FIG. 3C is a plot of the calculated and measured response functions versus time. The experimental compute result between two vectors of normal distributed random values matches with theoretical prediction. The clock rate is 2 GS/s.

FIG. 3D is a plot showing good correlation between the experiment compute result and the expected values, with an error of less than 2%.

FIG. 3E is a histogram of compute errors over 5000 input samples.

Figures 4A, 4B:
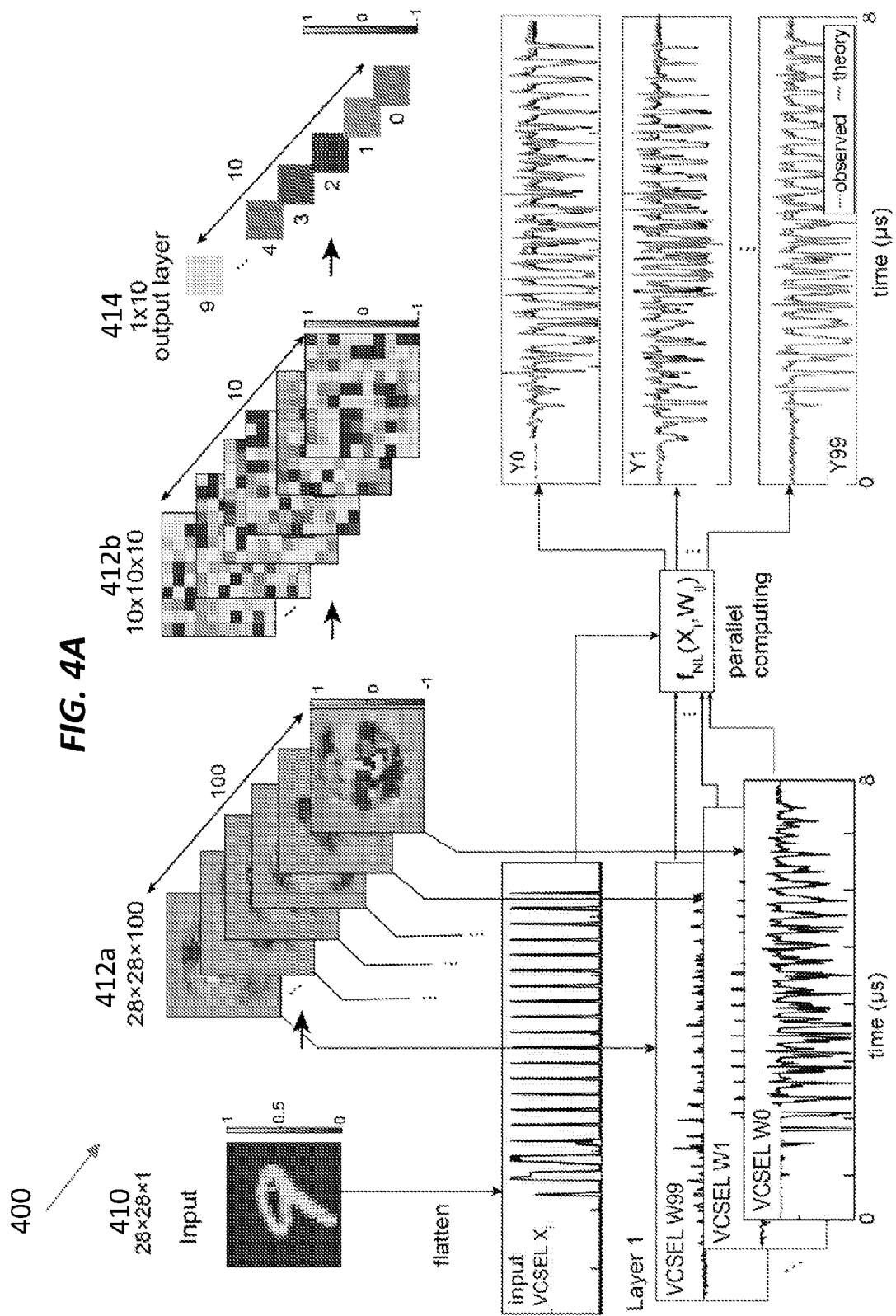

FIG. 4A illustrates an ONN model trained with a tailored nonlinearity that includes one input layer, two hidden layers, and an output layer.

FIG. 4B illustrates an example of parallel multiplication by the ONN model of FIG. 4A. The input image in layer 1 is flattened and encoded in time steps to the phase of the input vector X VCSEL. The weight matrix with 100 vectors is encoded to individual W VCSELs. The result of matrix-vector multiplication (lighter) is compared to the theoretical signal (darker).

Figure 4C:
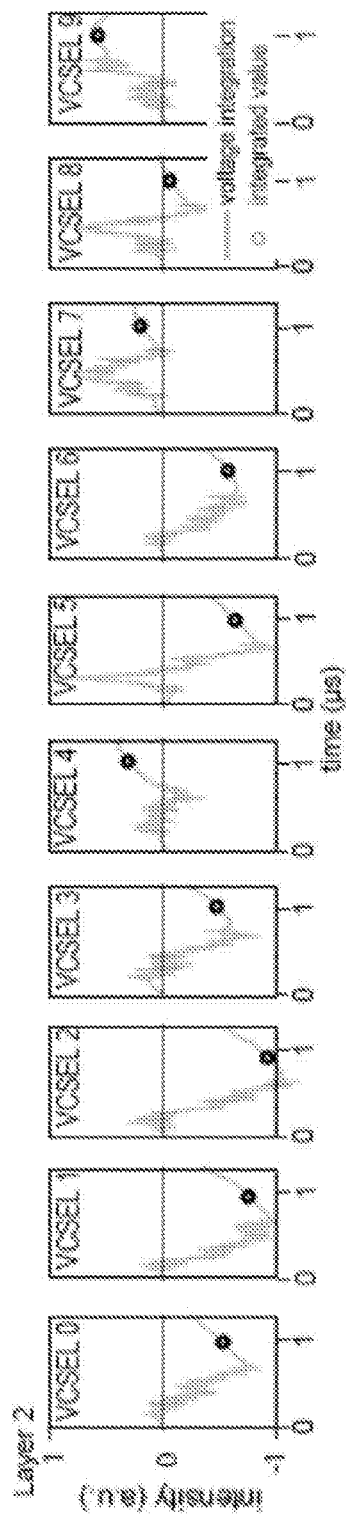

FIG. 4C illustrates an example of time integration of the interference signal in layer 2 of the ONN. The result of MNIST classification is read out by comparing the integrated voltage of the 10 processing VCSEL channels. The black dots are the integrated results.

Figure 4E:
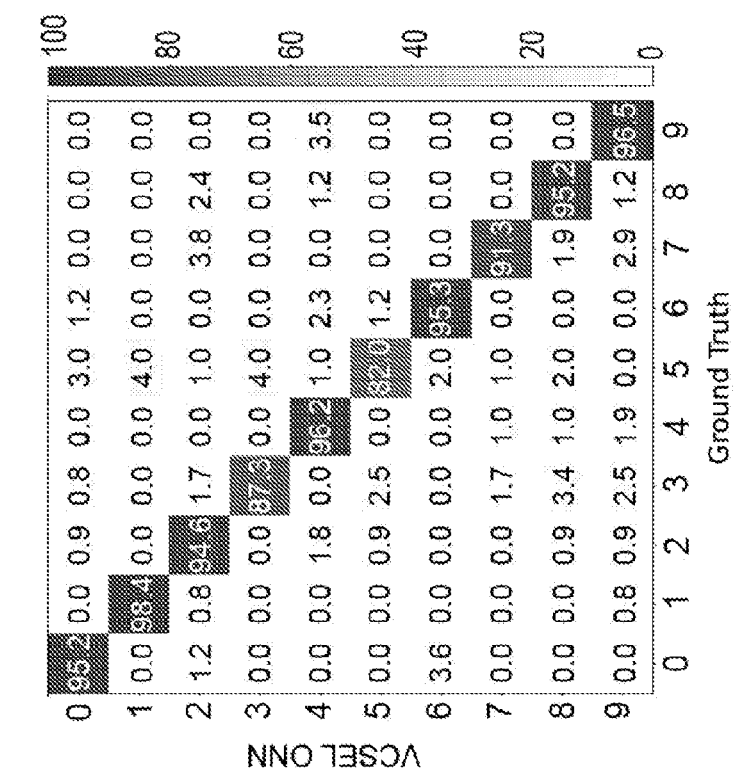
Figure 4D:
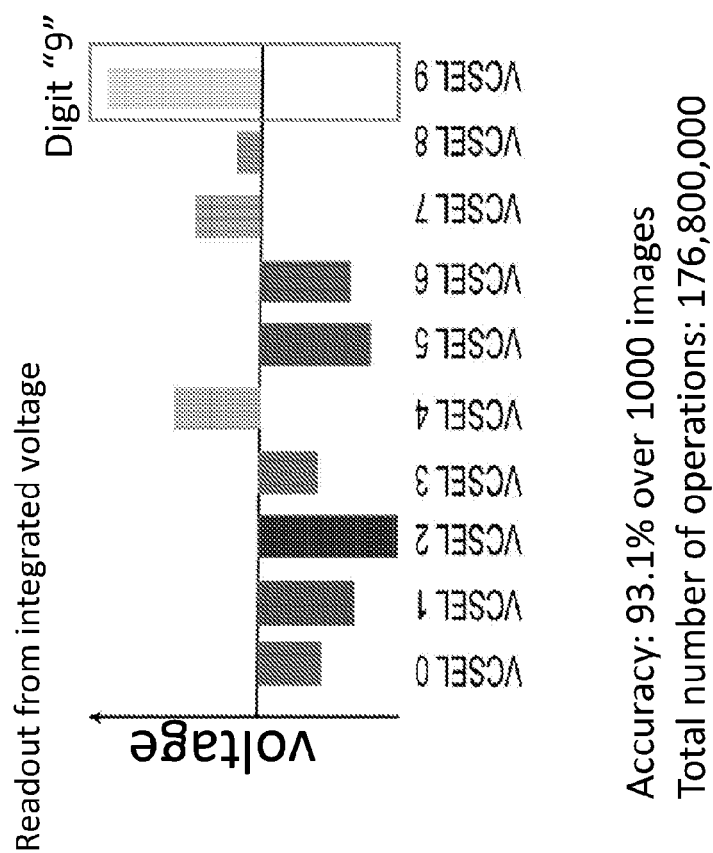

FIG. 4D is a plot of intensity at the output layer of the ONN.

FIG. 4E shows confusion matrices for the accuracy of the experiment illustrated in FIGS. 4A-4D.

Figure 5:
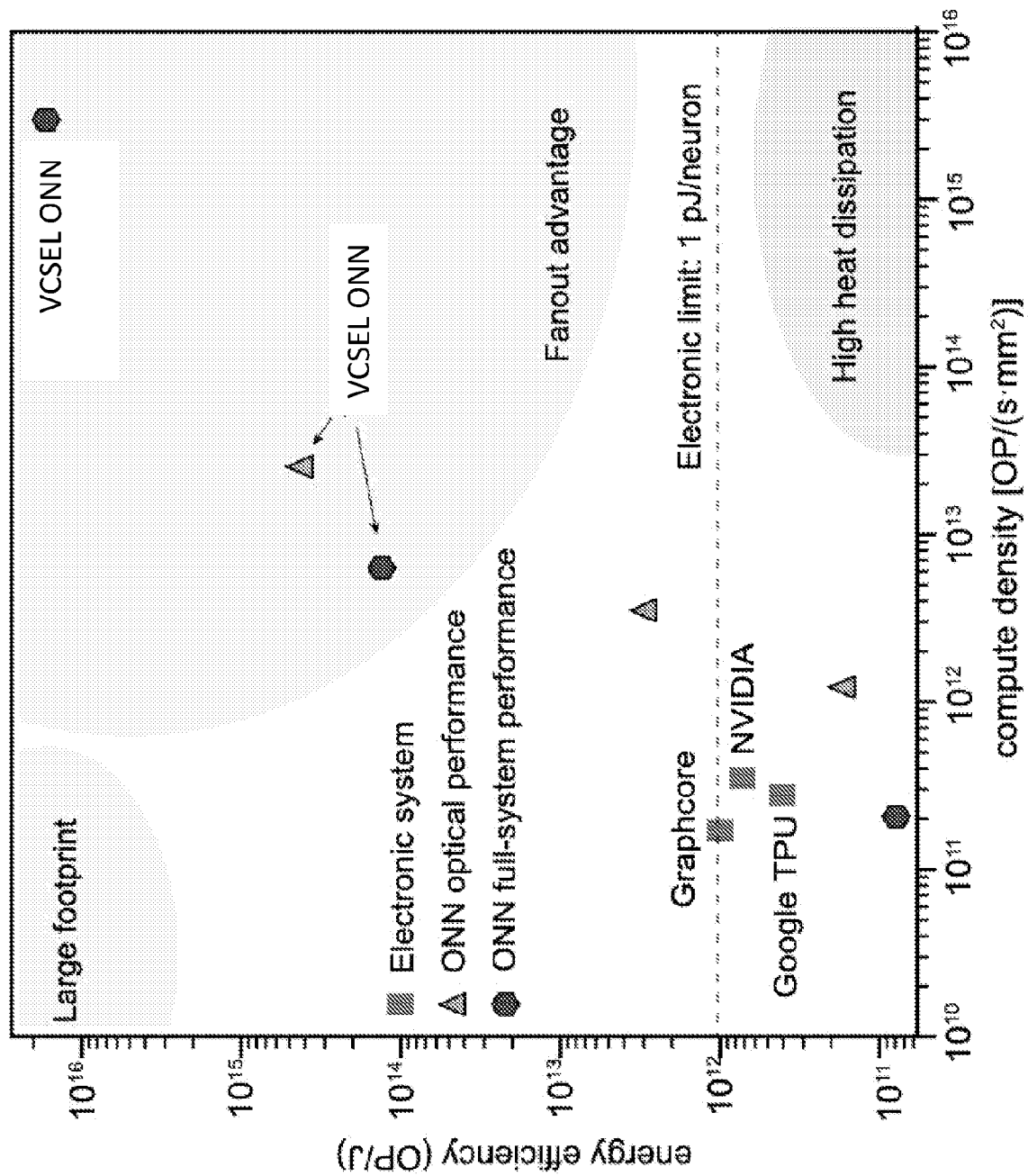

FIG. 5 is a plot comparing state-of-the-art neural network hardware.

DETAILED DESCRIPTION

Optical Neural Networks (ONNs) with Photonic Tensor Cores

Figure 1A:
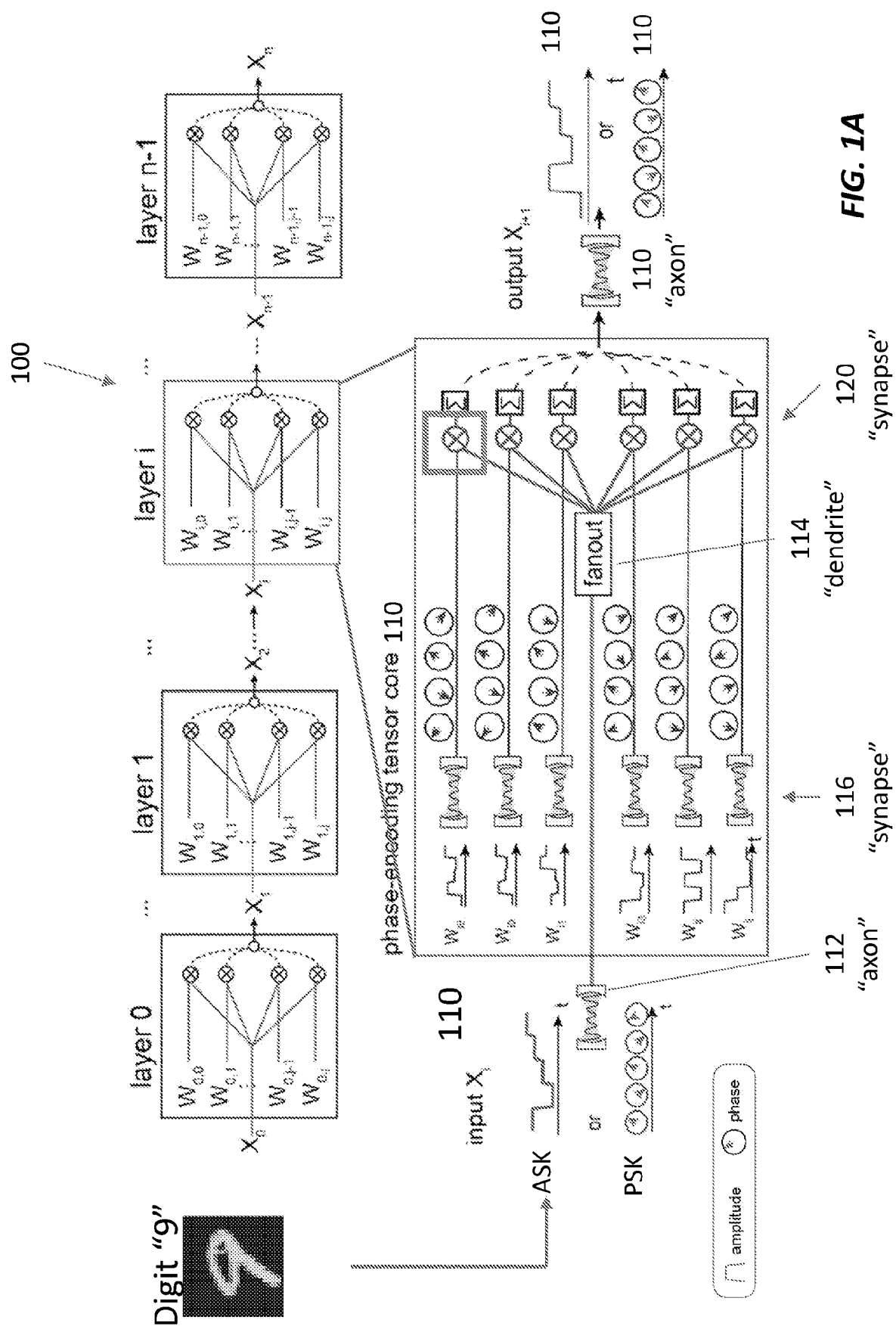
FIG. 1B shows optoelectronic components of the $i^{th}$ layer of the ONN of FIG. 1A.
FIG. 1C illustrates matrix-matrix multiplication using fanned-out activation and weight beams from a VCSEL array.
FIG. 1D illustrates homodyne balanced detection for linear multiplication of the input vector X and a weight vector W coherent optical interference.

FIGS. 1A-ID illustrate our ONN architecture 100. As shown in FIG. 1A, it includes a sequence of n layers (top), each of which computes the product of an activation vector (1×k) and a weight matrix (W). Each layer can be implemented optically as a phase-encoding photonic tensor core 110 (bottom). Similar to the axon-synapse-dendrite structure in biological neural networks, in each photonic tensor core 110, a laser transmitter ("axon") 112 accepts an activation vector (1×k), which is encoded to its amplitude using amplitude shift keying (ASK) or phase using phase shift keying (PSK). The beam of the axon laser 112 is fanned out to j copies for parallel operation ("dendrite") with a diffractive optical element (DOE) 114, phase mask, beam splitter, or another suitable optical component. The elements of the weight matrix, mapped in k time steps to an array of j PSK-encoded laser transmitters ("synapse") 116, are applied to the activation data via homodyne coherent detection based on the photoelectric effect with an array of homodyne receivers 120, one of which is shown in detail in FIG. ID. Each weighting laser beam beats with a copy of the input laser beam on a corresponding homodyne receiver 120, producing the homodyne product between the two laser fields. The resulting photocurrent is accumulated over k time steps, resulting an accumulated photocurrent $S_j \propto$ $$\sum_{t=1}^{k} A_W A_X \sin(\phi_W - \phi_X),$$

where $A_X$ and $A_W$, $\phi_X$ and $\phi_W$, respectively, are the amplitudes and phases of the input "axon" laser and the weighting "synapse" laser.

The PSK-encoded "synapse" laser transmitters 116 can be implemented as an array of injection-locked VCSELs, with the "axon" laser transmitter 112 as one of the VCSELs in the array. The VCSELs act as phase modulators with negligible amplitude perturbations, with phase tuning based on the thermo-optic effect at low data rates (e.g., <1 MHz) and based on free-carrier injection at higher data rates (e.g., 10 MS/s to GHz). The phase of the VCSEL emission ($\phi_d$) is governed by the frequency detuning ($\delta_d$) between a master laser (not shown), also called a leader laser, and a free-running VCSEL, $\sin(\phi) = \delta_d/\delta_r$, where $\delta_r$ is the injection-locking range. Tuning the frequency detuning da over the locking range $\theta_r$ allows the VCSEL phase to tune over ($-\pi/2$, $\pi/2$).

The weights can be encoded onto the driving voltages of the "synapse" VCSELs 116. This modulates the VCSELs detuning from the leader laser, leading to $$\sin(\phi_W) \propto W_j^j.$$

Figure 1B:
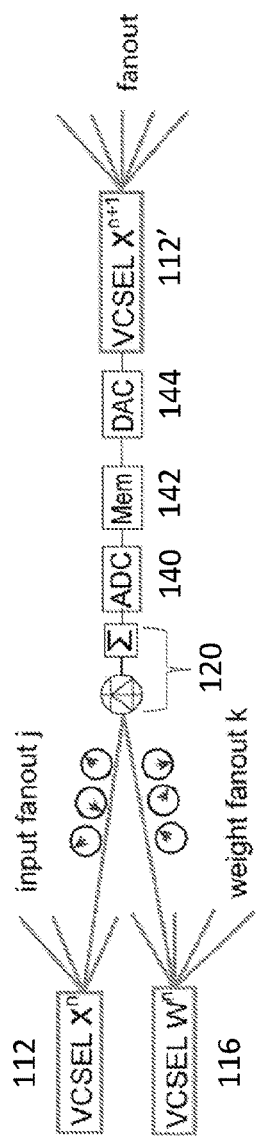

FIG. 1B illustrates the optoelectronic connection between layers of the ONN 100. As described above. (phase-) modulated outputs from the axon VCSEL 112 and one synaptic VCSEL 116 interfere at a homodyne receiver 120. An analog-to-digital converter (ADC) 140 converts the analog, electronic-domain output of the homodyne receiver 120 into a serialized digital signal suitable for storing in a memory 142. The memory 142 passes the stored digital values to a digital-to-analog converter (DAC) 144, which converts them to analog, electronic-domain signals suitable for driving the axon VCSEL 112' in the next layer of the ONN 100.

Alternatively, the serialization can potentially be realized optically by adding an optical path delay on each readout channel, with the delay time t being the data period. The delay is achieved in the optical domain with negligible loss. The integrated photon voltages can drive the input VCSEL at the next layer, without additional ADCs and DACs.

Fanning out of the activation vector(s) and the weight(s) allows the ONN's compute density to scale with the fanout factor of j, which is potentially true for the input laser that is fanned out with O(j) scaling in compute rates. This is achievable as the area of a VCSEL (e.g., 80×80 μm$^2$) is 10,000 times larger than the area of a detector pixel (0.8×0.8 μm$^2$ per detector), where the j detectors are used for reading out the matrix-vector product Y(1×j)=X(1×i)W(i×j). Unfortunately, the areal density of the weighting VCSELs can constrain the achievable compute density. Fortunately, this constraint can be alleviated by broadcasting the weights to implement matrix-matrix multiplication Y(k×j)=X(k×i)W(i×j).

Figure 1C:
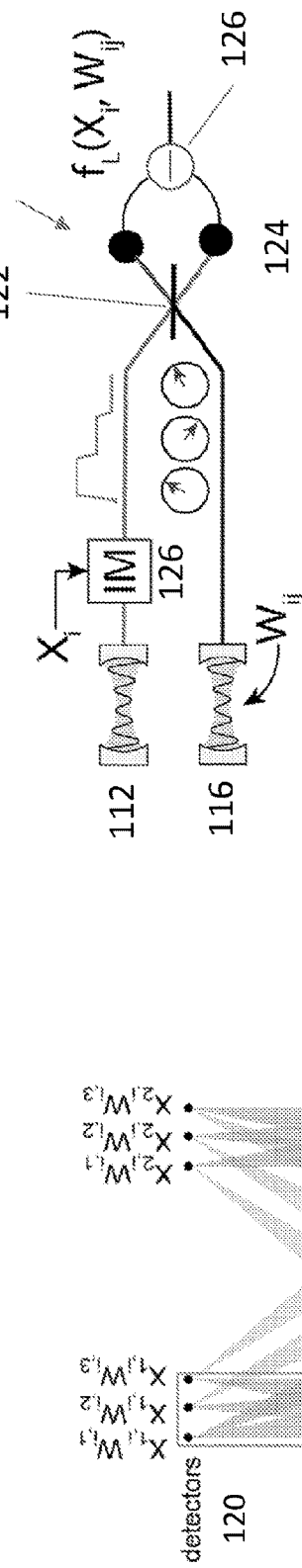

FIG. 1C shows how both the activation vector and weights can be fanned out for matrix-matrix multiplication with increased compute density. In FIG. 1C, an array of five VCSELs computes the product of an input matrix $[X_{1,i}, X_{2,i}]$ with k=2 input vectors and a weight matrix $[W_{i,1}, W_{i,2}, W_{i,3}]$ with j=3 weight vectors (i is encoded in time steps not shown in FIG. 1C). Two of the VCSELs are designated as "axon" lasers 212. Their outputs are modulated with the respective input vectors and fanned out by lenses and DOEs 114 to different sets of three of the homodyne receivers 120. The other three VCSELs are designated as "synapse" lasers 216. Their outputs are modulated with the weights and fanned out by lenses and DOEs 114 to all of the homodyne receivers 120.

Figure 1D:
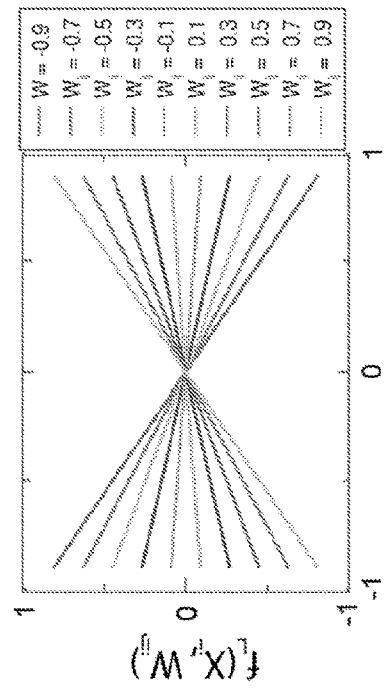

The homodyne receivers 120 can be used for either linear operations or nonlinear operations. To perform linear multiplication, the input vector $X^i$ is amplitude-encoded onto the output of the input laser 112, e.g., using an external modulator 126 with $A_X \propto X^i$ as shown in FIG. 1D (described below). The interference between the fanned-out amplitude-modulated input laser beam and the weight laser beams is a linear matrix-vector multiplication of the weight matrix and the activation vector:

$$f_L(W_j^i, X^i) \propto \sum_{t=1}^{k} W_j^i X^i \qquad (1)$$

For linear multiplication, the homodyne receiver can be implemented as a balanced homodyne receiver 120'. This balanced homodyne receiver 120' includes a 2×2 beam splitter 122 whose input ports receive beams from the "axon" laser 112 and one of the "synapse" lasers 116 and whose output ports are coupled to a pair of photodetectors 124. Circuitry 126 takes the difference in the analog outputs of the photodetectors 124. In this case, the output of the "axon" laser 112 is amplitude modulated with the activation vector $X^i$ by an external amplitude modulator 126, so the output is the product of elements of the activation vector and the weight matrix. The balanced homodyne receiver 120' can be connected to a switched integrator charge amplifier (not shown). The capacitor in the integrator accumulates charges when the switch is on and outputs an integrated voltage when switched off.

The output of the balanced homodyne receiver 120' is the serialized product of the input vector and the weight matrix and can be subject to an element-wise nonlinear activation as in a general neural network—i.e., calculate the product Y=XW in the optical domain, then perform a nonlinear operation on the product, either in the electronic domain or the optical domain. For instance, the product can be used to phase-modulate another layer of VCSELs whose phase-modulated outputs interfere and are detected at homodyne receivers. In this architecture, each neural network layer has two successive VCSEL/homodyne receiver layers.

Alternatively, the ONN 100 can operate according to a different neural network model, where the homodyne receiver 120 performs a nonlinear operation that combines the linear weighting with the nonlinear activation:

$$\propto \sum_{i=1}^{k} \left[ W_j^i \sqrt{1 - (X^i)^2} - X^i \sqrt{1 - (W_j^i)^2} \right] \quad (2)$$

For this nonlinear operation, the input vector is phase-encoded onto the output of the input laser 112 with $$\sin(\phi_X) \propto X_i^j.$$

Similarly, the weight matrix phase-encoded is phase-encoded onto the outputs of the other VCSELs. The resulting interference between the phase-encoded input laser beam and the weight laser beams is a nonlinear weighing operation. This nonlinear operation is discussed in greater detail below with respect to FIGS. 3A-3E.

Based on space-time multiplexing and fanout data copying, the system is optimized for computing at high density and energy efficiency. It performs matrix-vector multiplication using i time steps and j coherent receivers. With the axon input laser 112 shared among j channels (j-time parallelism), the number of VCSELs and photodetectors scales linearly with O(j). Conversely, in a CMOS neural network architecture, the number of CMOS-based microprocessors and integrated ONN circuits scales quadratically with O(i× j). The ONN 100 is thus simplified significantly with lower device counts. A constraint to the architecture is the use of one weight laser per compute channel, which gives a quadratic scaling of device counts; however, as batch operations are required in many machine learning tasks, the entire weight matrix can be spatially fanned out to k copies for processing a batch of k input vectors simultaneously, enabling matrix-matrix multiplication Y(k×j)=X(k×i)W(i× j), with a parallelism factor of i×j.

VCSEL-Based ONN Implementation

Figure 2A:
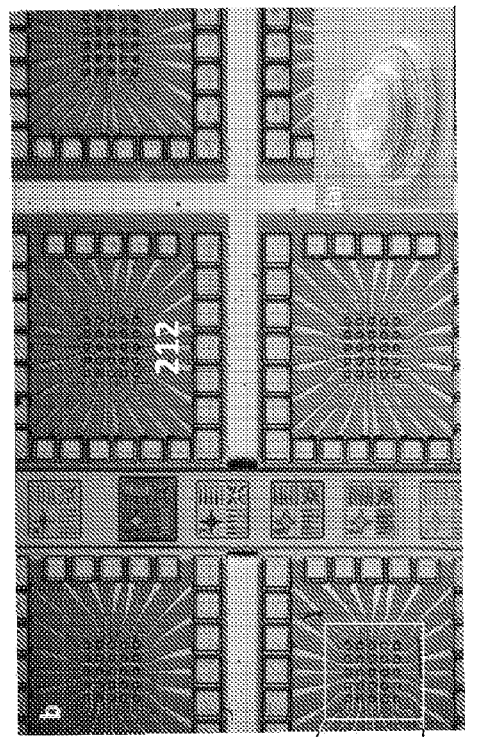
FIG. 2A is an exploded perspective view of a monolithic photonic axon-synaptic-dendrite tensor processor.

FIGS. 2A-2H illustrate an implementation of the VCSEL-based ONN architecture 100 shown in FIG. 1A in state-of-the-art silicon CMOS technology. FIG. 2A shows an integrated photonic tensor core 210, also called a compute engine, implemented as a monolithic device with optoelectronic co-packaging in a three-dimensional design. The integrated photonic tensor core 210 includes arrays of individually addressable VCSELs 212 for axon-synaptic data encoding. The VCSEL array 212 is electrically and physically coupled to a CMOS driver 216 on one side; on the other (optical output) side, the VCSEL array 212 is bonded to a holographic phase mask 214 with a first layer of transparent polymer 213. A second layer of transparent polymer 215 bonds the holographic phase mask 214 to a CMOS detector array 220.

Figure 2B:
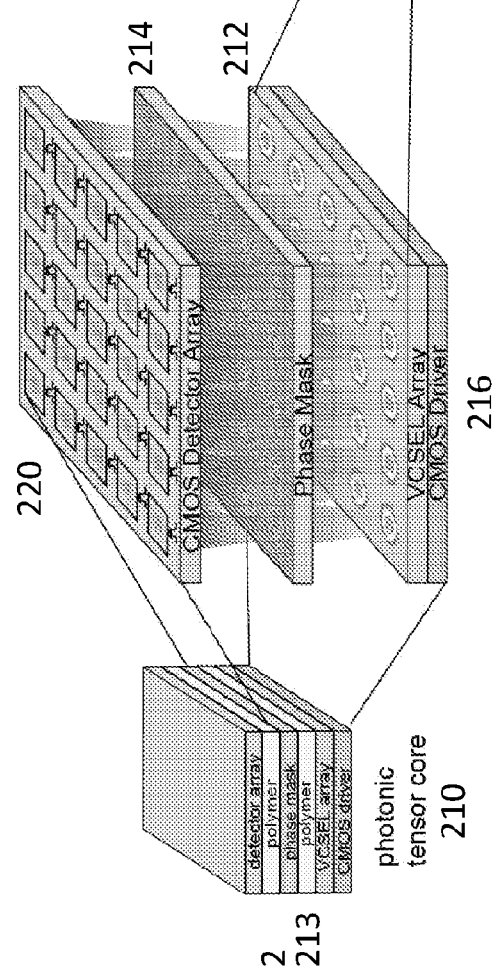
FIG. 2B shows photographs of arrays of 5×5 VCSEL samples on a silicon chip.

FIG. 2B is a photograph of several 5×5 VCSEL arrays suitable for use in a photonic tensor core. The VCSEL arrays are excellent building blocks for next-generation ONNs because they have (i) high integration device density, e.g., 80×80 µm² per VCSEL with electronic wire bonds as shown in FIG. 2B; (ii) high modulation bandwidth, e.g., with 25 GS/s modulated data rates as shown in FIG. 2E; and (iii) high scalability, being fabricable on the wafer scale and adaptable with state-of-the-art optical interconnects, therefore fulfilling criteria C1 and C4 in TABLE 1. Harnessing dendritic fanout (to N copies) based on holographic phase masks, the energy consumption (C2) for data encoding is reduced by a factor of N. The nonlinearity (C3) is induced with coherent detection using phase-encoding.

The 5×5 VCSEL arrays in FIG. 2B were fabricated as semiconductor heterostructure microresonators with two AlGaAs/GaAs distributed Bragg reflectors as cavity mirrors and a stack of InGaAs quantum wells as the gain medium. The cavity arrays were patterned by ultraviolet (UV) lithography and etched by an inductively coupled plasma reactive ion beam.

Each cavity had an outer diameter of 30 µm and was oxidized to an aperture of 4.5 µm for suppressing the higher-order transverse modes. To improve the laser stability, the whole chip was clad with a polymer layer and the areas of the VCSEL cavities were reopened. The Au-deposited p-contact of each VCSEL was connected to a signal pad, which was wire bonded to a printed circuit board (e.g., CMOS driver 216 in FIG. 2A) linked to external drivers (not shown). All the VCSELs shared a common ground (golden bars in FIG. 2B). The VCSELs had a cross-section with 1% ellipticity, which allowed polarized laser output with improved extinction ratio.

In operation, a laser driver (e.g., CMOS driver 216) forward biased the VCSELs (e.g., 2 VDC) above their lasing threshold and applied a small AC voltage (e.g., <10 mV) signal modulation to the VCSELs. Each VCSEL emitted 100 µW of light with a wall-plug efficiency of 25%. The modulation bandwidth of each VCSEL was about 2 GHz (at 3 dB), limited by the photon lifetime of the VCSEL cavity (e.g., Q≈10⁵). For matrix-vector multiplication, one of the VCSELs 212 was used as an axon laser (encoding input data $X^i$) and the outputs of the other VCSELs 212 were encoded with synaptic weight vectors $$[W_0^i, \ldots, W_j^i].$$

Sharing beam paths improves the interferometric stability in homodyne detection.

Figure 2C:
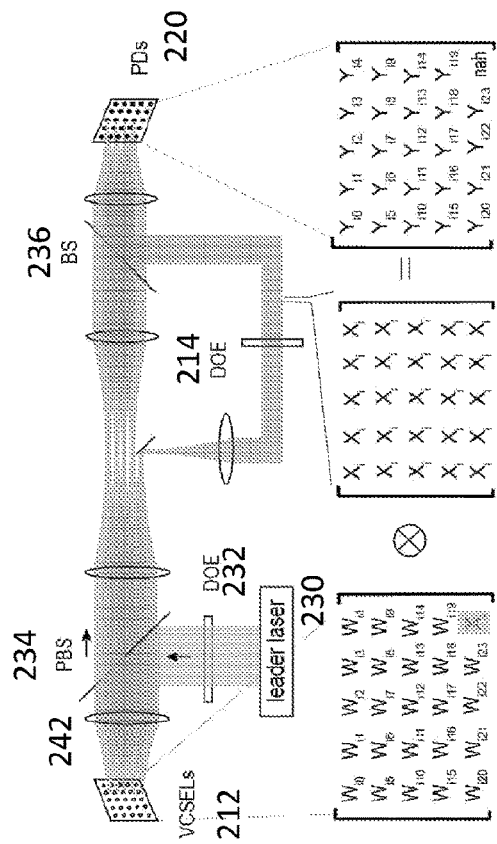
FIG. 2C illustrates an experimental setup for injection locking of a VCSEL array in an ONN.

FIG. 2C shows fan-out of the beam from the "axon" VCSEL 212 (lower right corner). Limited by the large dimension of the fanout DOE 214, the output of corner laser is separated from the weight beams and then fanned out by the DOE 214. (Beam separation is not necessary with a compact DOE.) The DOE 214 imprints a phase pattern on the beam profile, which fans out to an array of beams/spots. For example. FIG. 2F is an image of the Fourier plane of a DOE fanning a beam out to a 32×32 array of spots.

A beam splitter (BS) 236 superimposed each fanned-out activation beam spot and a corresponding weight laser beam $W_{ij}$ on a corresponding photodetector in a 5×5 photodetector (PD) array 220 for coherent homodyne detection. The photodetectors detected the interference between the synaptic VCSEL outputs and the axon copies $Y_i$. The interference signals from the photodetector array were integrated with an integrating receiver, followed by a 16-channel data acquisition card.

FIG. 2E shows analog data encoded by the single VCSEL beam (each spot in FIG. 2F) modulated at 25 GS/s. The MIT logo in the upper plot was constructed with a time sequence of 2000 samples. A 28×28-pixel image with a handwritten digit (middle row) was flattened and encoded over a duration of 31.36 ns. The frequency response of the injection-locked VCSELs in the thermal region (<10 MHz) was about 10 dB stronger than that in the free-carrier region. To decouple from thermal effects at low modulation frequencies, the data was modulated with a high-frequency local oscillator. This data modulation scheme is not needed with VCSELs operating at higher data rates.

FIG. 2C also illustrates free-space injection locking of the VCSELs 212 to a leader laser 230. The VCSELs emitted at wavelengths of around 974±0.1 nm over the entire array. This excellent wavelength homogeneity enabled parallel injection locking over the whole array to the leader laser 230 (e.g., another VCSEL). Injection locking the VCSELs 212 to the leader laser 230 established mutual coherence among the VCSELs 212 for homodyne detection.

A first diffractive optical element (DOE) 232 in the Fourier plane of a coupling lens 242 splits an injection-locking beam emitted by the leader laser 230 into a 3×3 array of injection-locking beams with grid spacing or pitch equal to the pitch of the VCSEL array 212. A polarizing beam splitter (PBS) 234 reflects the array of injection-locking beams through the coupling lens 242 and into the VCSELs 212. The PBS 234 is rotated by 45 degrees with respect to the polarization state of the outputs of the VCSELs 212, so half of the power of the injection-locking beams is coupled to the VCSEL 212, locking the phases of the VCSELs 212. The front DBRs of the VCSEL cavities reflect the other half of the power of the injection-locking beams. The PBS 234 rejects this reflected light to avoid producing undesired interference at the homodyne detectors. The VCSELs 212 are tuned to a target wavelength using an electronic DC forward bias from the VCSEL drivers (CMOS drivers 216), facilitating simultaneous injection locking of the entire VCSEL array 212. The injection lock can be confirmed by monitoring the beat note between the leader laser 230 and each VCSEL 212.

Figure 2D:
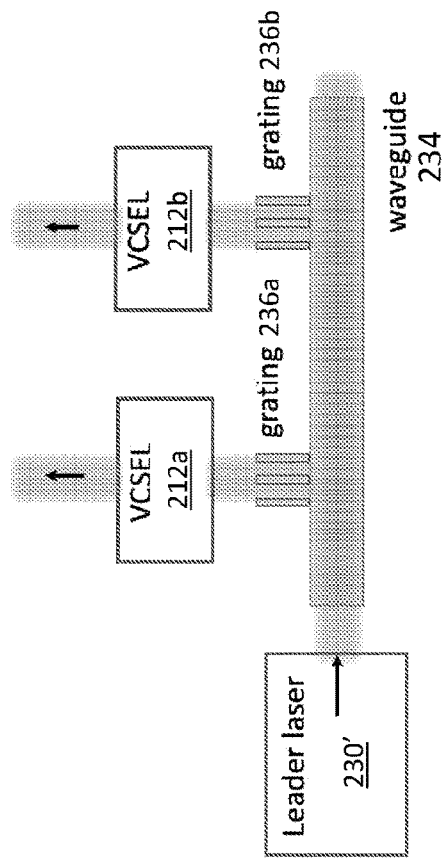
FIG. 2D illustrates a waveguide-based architecture for injection-locking VCSELs to a leader laser.
Figure 2E:
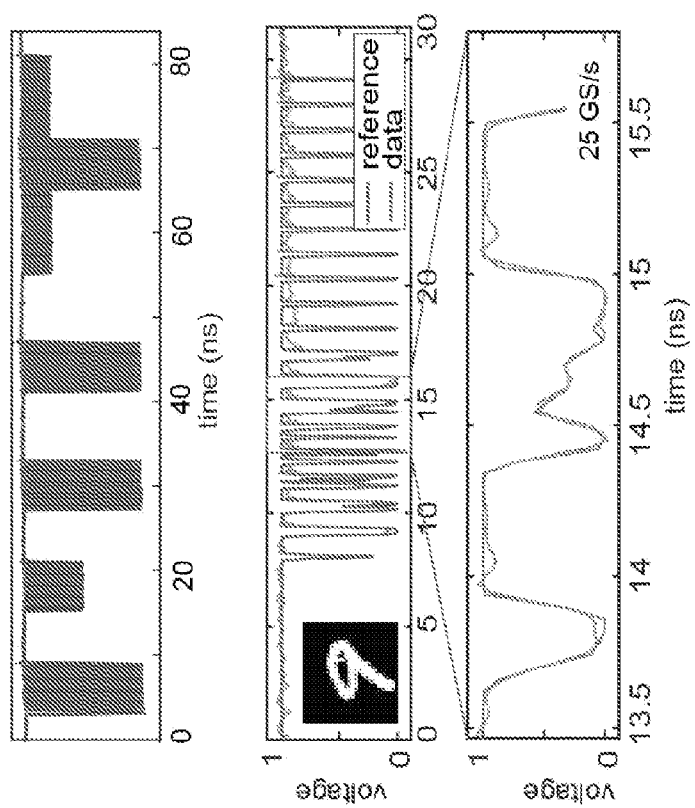
FIG. 2E illustrates data encoding in the experimental setup of FIG. 2C with VCSEL amplitude modulation at 25 GS/s.

Alternatively, the VCSELs 212 can be injection-locked in waveguide-based architecture as shown in FIG. 2D. In this waveguide-based architecture, the leader laser 230' is coupled to a waveguide 234, which guides the injection-locking beam from the leader laser 230' to the back sides of the VCSELs 212. Gratings 236a and 236b couple portions of the injection-locking beam out of the waveguide 234 and into VCSELs 212a and 212b, respectively, through the VCSELs' rear DBRs Each rear DBR couples some of the injection-locking beam into the corresponding VCSEL cavity and reflects the rest of injection-locking beam back toward the correspond grating.

The phase of an injection-locked VCSEL 212 is given by the frequency detuning between the leader laser 230 and the VCSEL's free-running frequency, $\sin(\phi)=\delta_d/\delta_r$, where $\delta_r$ is the injection-locking range and $\delta_d$ is the frequency detuning. The injection-locking range is proportional to the square root of the injecting power, so a small half-wave voltage $V_\pi$ (e.g., in the mV range) is achieved by reducing the injecting power (e.g., to about 1 µW per VCSEL). FIG. 2G is a plot of the homodyne signal versus VCSEL driving voltage. Driving the VCSEL resonance over the injection-locking range allows a phase shift of $(-\pi/2, \pi/2)$, $V_\pi$=4 mV.

Figure 2H:
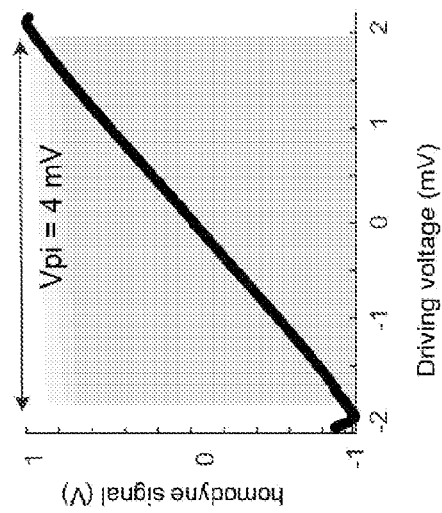
FIG. 2H is a plot of laser detuning versus leader laser detuning for injection locking of a 3×3 VCSEL array to a leader laser.
Figure 2G:
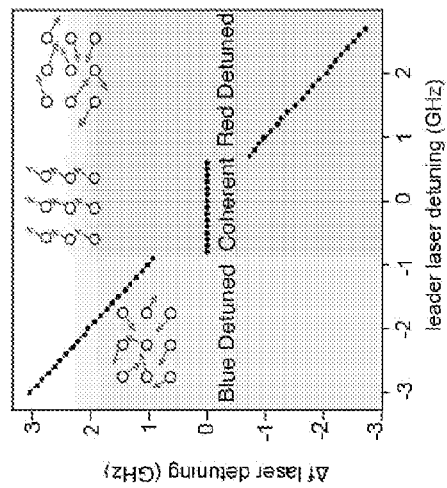
FIG. 2G is a plot of homodyne signal voltage versus driving voltage for a phase-modulated, injection-locked VCSEL whose output is homodyne-detected.
Figure 2F:
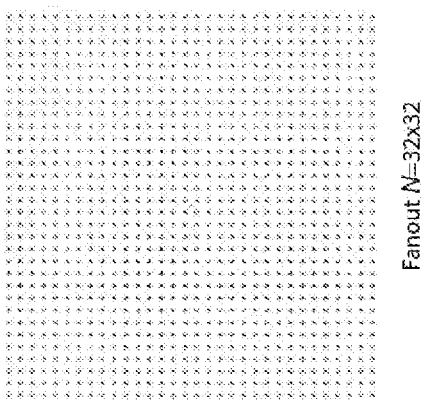
FIG. 2F illustrates optical fanout of a VCSEL operating at 25 GS/s to a 32×32 array.

FIG. 2H is a plot of the VCSEL detuning versus leader laser detuning. It illustrates the injection-locking range. It is measured by monitoring the beat note between the leader laser and each VCSEL. An injection power of 500 nW per VCSEL yields an injection-locking range of 1.7 GHz and phase modulation with $\pi$ phase shift voltage of $V_\pi$=4 mV at a 100 MHz rate. Such a small $V_\pi$ allows phase-only modulation with negligible amplitude modulation.

Nonlinearities and Computing Accuracy of Homodyne Interference

Figure 3A:
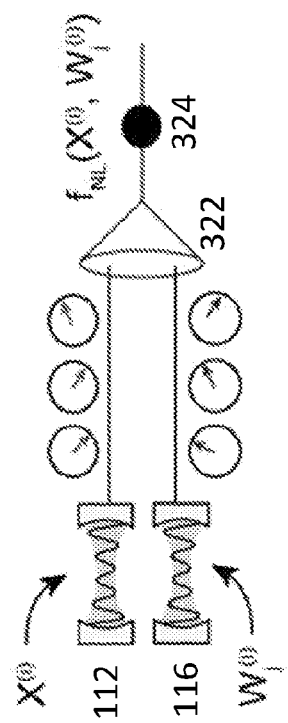
FIG. 3A illustrates a nonlinearity induced by photoelectric multiplication, with interference between two phase-encoded laser fields yielding nonlinear weighting on the input vector X(i).
Figure 3B:
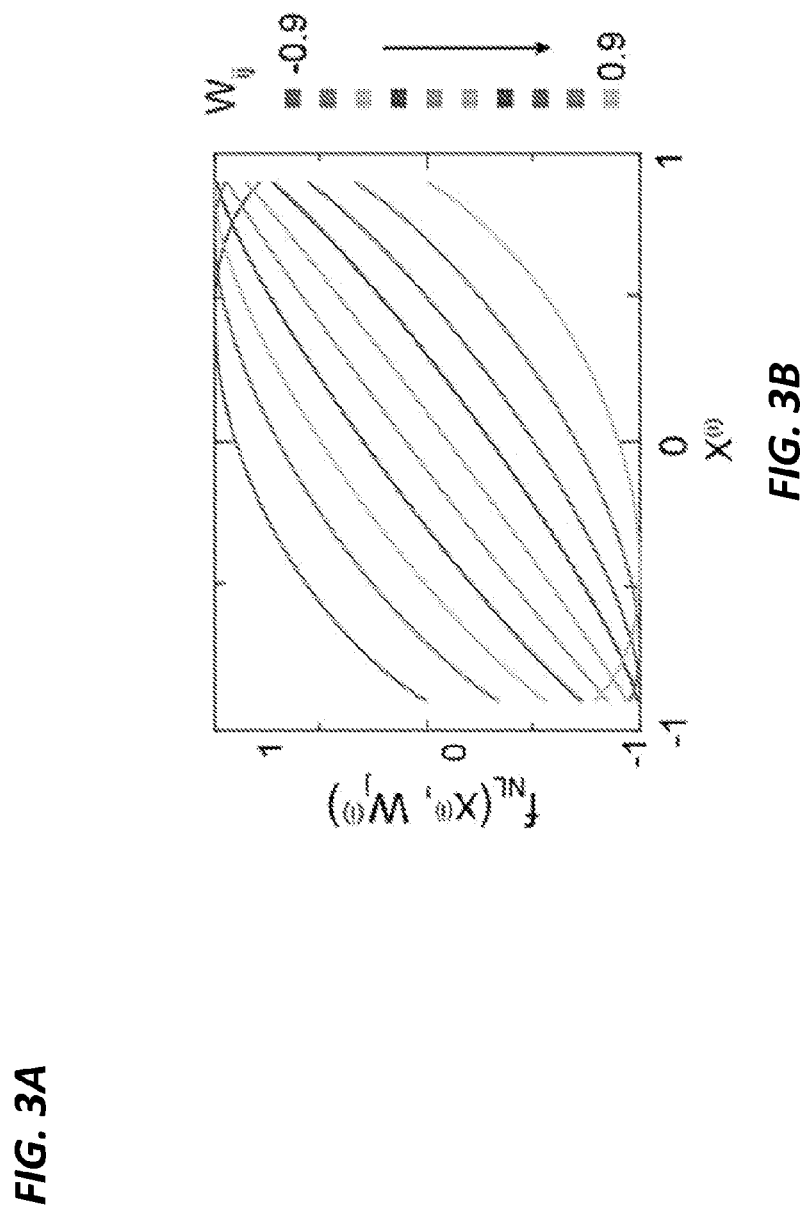
FIG. 3B is a plot of the nonlinear response versus input vector at different weights. The nonlinearity increases with higher weights, as in biological neural systems.

FIGS. 3A-3E illustrate a detection-based optical homodyne nonlinearity suitable for use in a VCSEL-based ONN. As shown in FIG. 3A, this detection-based optical homodyne nonlinearity is implemented with a photodetector 324 that detects the homodyne interference of phase-modulated beams, combined with a beam combiner 322, from the "axon" VCSEL 112 and a "synaptic" VCSEL 116. The plot in FIG. 3B shows that programming the phase of the weight VCSEL 116 tunes the strength of the homodyne nonlinearity. As homodyne detection relies on the photoelectric effect, where an electron is elevated to the conduction band by the absorbed photon, the process is nearly instantaneous, with a time delay of tens of attoseconds. The resulting latency is as short as the optical pulse per symbol, which can be below femtosecond. This is in contrast to the nanosecond delay with digital nonlinearities, electro-optic nonlinearities, and cavity or atom-based optical nonlinearities. Its implementation with a photo-detector is ultra-compact without instrumental complexity (e.g., ultrashort laser pulses).

FIG. 3B is a plot of the input-output nonlinear response of the phase-modulated VCSEL-VCSEL interference $$f_{NL}(W_j^i, X^i)$$

at different weight values. Similar to biological synaptic weighting, the output value scales with a higher nonlinearity at higher weight values. We characterized the fidelity of the homodyne interference by phase-modulating two VCSELs with a set of 5,000 random data at 1 GS/s with 10-mV peak-to-peak voltage. FIG. 3C shows good agreement between the resulting interference signal and the calculated result. The standard deviation of "calculated-observed" discrepancy in FIG. 3D reveals a computing accuracy of about 98% (6 bits of precision). FIG. 3E is a histogram of the errors. Without being bound by any particular theory, the accuracy appears to be limited mainly by the frequency response of the injection-locked VCSELs, the residual coupling of amplitude modulation, and the phase stability of the setup.

VCSEL-Based ONN Inference Demonstration

FIGS. 4A-4E illustrate DNN inference with our axon-synapse-dendrite VCSEL-based ONN architecture trained on 1,000 test images of handwritten digits from the Modified National Institute of Standards and Technology (MNIST) database. To this end, we developed a training process with PyTorch using our unique nonlinear weighting function.

FIG. 4A shows the training model 400 itself, which included one input layer 410, two fully connected hidden layers 412a and 412b, and an output layer 414. The input layer 410 includes 784 neurons, corresponding to a full-size MNIST image with a handwritten digit (e.g., a handwritten "9" as shown at left in FIG. 4A). In each fully connected hidden layer 412, the matrix-vector multiplication is computed with a custom nonlinear synaptic weighting function. The output layer 414 includes 10 neurons, where each neuron represents a digit (from 0 to 9); the training model's prediction of the digit represented by the input is given by the number of the neuron with the largest value.

For training, each 28×28-pixel test image was flattened and encoded in 784 time-steps onto the phase of an input VCSEL at driving voltage of 4 mV, as shown at left in FIG. 4B. Each weight vector was the same size and was flattened and sent to a synaptic VCSEL, with one weight vector per synaptic VCSEL. Parallel spatial multiplexing allowed all the weight vectors to be processed simultaneously. However, limited by the number of high-speed arbitrary waveform generator (AWG) channels available to generate the data, the data were taken with 10 VCSELs modulated at a rate of 100 MS/s. By switching the AWG channels and translating the VCSEL chips to different arrays in the x- and y-directions, a total of 100 VCSELs from 5 VCSEL arrays are used to compute the second hidden layer 412b.

FIG. 4B shows the interference signal between the image data and a weight vector and a digitally calculated result. There is excellent agreement between measured and calculated interference signals for the image data and weight vectors. The interference signal was integrated over time with an integrating receiver at each channel, resulting in 100 integrated values as an input vector to the output layer 414. The signal-to-noise ratio (SNR) in the time trace is 135, limited by the photon shot noise. The photocurrent at each channel was accumulated over time with a time integrator. The integrated values from the 100 channels were serialized, forming an input vector feeding into the next layer. The weights in the output layer 414 were implemented with 10 weighting VCSELs and the interference signal was integrated.

FIG. 4C shows the real-time integration of the interference signal in the output layer 414. The result of image classification was read out directly from the voltage level of the integrated value of the 10 VCSEL channels, which are shown in FIG. 4D. Running inference over a random dataset of 1,000 images, with a total of 158.8-million operations, yielded an accuracy of (93.1±2) %, which is statistically indistinguishable from the model accuracy in simulation (95.2%).

Performance of a VCSEL-Based ONN

FIG. 5 is a plot of energy efficiency versus compute density for state-of-the-art neural network hardware, including the VCSEL-based ONN disclosed here. The Google tensor processing unit (TPU), NVDIA graphics processing unit (GPU), and Graphcore are application-specific integrated circuits (ASICs) optimized for deep learning tasks with energy efficiency and compute density reaching 1 pJ/OP (Graphcore) and 0.35 TeraOP/(mm$^2$·s), respectively (NVDIA A100). For the ONN optical performance, the energy efficiency accounts for the electrical power in laser generation and data encoding, while the compute density is calculated from the chip area for matrix operations. For ONN full-system performance, the energy consumption and compute density account for laser generation, data encoding, nonlinear activation, data readout, signal amplification, ADC, DAC, and memory access. For a VCSEL-based ONN, spatial fan-out and time-domain fan-in can reduce the energy bound due to electronics.

A VCSEL-based ONN enables efficient computing thanks to low-energy VCSEL transmitters and optical parallelism. The clock rate of an example VCSEL-based ONN is 1 GS/s (as demonstrated in FIG. 3), limited by the VCSEL bandwidth. Due to the ultralow (e.g., $V_\pi$=4 mV) operation, data encoding with a VCSEL modulator consumes very little power, e.g., 3.7 nanowatts (3.7 attojoules per symbol at 1 GS/s), which is six orders of magnitude lower than the power consumption of ONNs with thermal phase shifters, microring resonators, optical attenuators, and electro-optic modulators, each of which consumes several milliwatts of electrical power. As a result, the main optical energy consumption in a VCSEL-based ONN is usually for laser generation.

VCSEL sources are efficient laser generators with wall-plug efficiencies of 25% or higher (e.g., over 57%). The theoretical lower bound to laser power is given by the number of photons required to produce a homodyne signal with sufficient bits of compute precision, which is ultimately limited by the required SNR from detection. Time integrating receivers, in contrast to conventional amplified detectors, read out only after accumulating over several time steps, improving the SNR. With off-the-shelf technology, the thermal noise limit of computing from integration detection is 200 photons/OP (corresponding to 40 aJ/OP). In our experimental demonstration, the VCSELs emitted 100 μW. The resulting optical energy efficiency, which includes electrical power for laser generation and data modulation, is 2.5 fJ/OP (owing to the fan-out advantage). Our VCSEL-based ONN's optical energy efficiency of 2.5 fJ/OP is at least 140 times better than that of state-of-the-art integrated ONNs.

A VCSEL-based ONN incurs energy costs from electronic digital-to-analog converters (DACs), analog-to-digital converters (ADCs), signal amplification, and memory access. The energy of DAC and memory access per use is reduced by a factor of j due to spatial parallel processing with laser fanout. The read-out electronics, including ADCs, transimpedance amplifiers, and integrators, are triggered one once after time integration. Their energy cost per use is amortized by a total of 2i intervening operations. Thereby the full-system energy efficiency including both electronic and optical consumption is 7 fJ/OP, which is more than 100 times better than that of state-of-the art electronic microprocessors. Similar to the fanout of the input laser, the weight VCSELs can be spatially fanned out (with a factor of k), which reduces the energy for weighting to the same order of the input encoding.

A VCSEL-based ONN has high compute density thanks to the compactness and density of VCSEL arrays in a three-dimensional architecture. VCSELs are excellent candidates for high-density computing with a pitch of 80 μm per fabricated device. Nano/micro-pillar lasers, which may have <1 μm diameters and <10 μm pitches, offer similar advantages and can be used instead of VCSEL arrays. The compute density in the VCSEL-based ONN demonstrated here reaches 25 TeraOP/(mm$^2$·s), which is about two orders of magnitude higher than that of electronic counterparts. In electronic circuits, improving throughput density is challenging due to limited heat dissipation per chip area. The higher energy efficiency of a VCSEL-based ONN allows higher throughput density. In other ONN configurations, high throughput density involves tiling photonic devices at high density, which often leads to severe crosstalk between neighboring channels and decreased compute accuracy. The channel crosstalk in our VCSEL-based ONN is reduced or even eliminated with VCSEL modulators with ultra-low half-wave voltages.

A VCSEL-based ONN operates with ultralow latency for nonlinear activation thanks to detection-based nonlinearity. In a VCSEL-based ONN, each detection event generates a photon current instantaneously, and the photon currents are accumulated in the time integrator for i time steps before being read out. The transit time of photon electrons from the photodiode to the charging capacitor, which leads to latency in standard photodetectors, is negligible compared to the integration time. Thus, the latency due to nonlinear activation is negligible. The processing time is dominated by the data encoding and time integration, which could be 30 ns for a full-size MNIST image at the clock rate of 25 GS/s.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims. "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of," "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including." "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical neural network comprising:
an array of vertical-cavity surface-emitting lasers (VCSELs) comprising a first VCSEL to emit a first beam phase-modulated with an activation vector and second VCSELs to emit second beams phase-modulated with weights of a weight matrix of the optical neural network and coherent with the first beam;
a diffractive optical element, in optical communication with the first VCSEL, to fan out the first beam; and
an array of photodetectors, in optical communication with the array of VCSELs and the diffractive optical element, to detect interference between respective fanned-out copies of the first beam from the diffractive optical element and the second beams.

2. The optical neural network of claim 1, wherein the array of VCSELs is monolithically integrated with the diffractive optical element and the array of photodetectors.

3. The optical neural network of claim 1, wherein the array of VCSELs is configured to be modulated with a half-wave voltage of less than 10 mV.

4. The optical neural network of claim 1, wherein the array of VCSELs is configured to be modulated at a rate of at least 1 Gb/s.

5. The optical neural network of claim 1, wherein the array of photodetectors is configured to generate outputs proportional to $$\sum_{t=1}^{k} A_{W,k} \sin(\phi_{W,k} - \phi_X),$$

where $A_X$ and $\phi_X$ are the amplitude and phase, respectively, of the first beam and $A_{W,k}$ and $\phi_{W,k}$ are the amplitude and phase, respectively, of the kth second beam.

6. The optical neural network of claim 1, wherein the optical neural network has a compute density of at least 10 TOPS/(mm²·s).

7. The optical neural network of claim 1, wherein the optical neural network is configured to operate at an energy consumption of 1 fJ/OPS.

8. The optical neural network of claim 1, further comprising:
a leader laser, in optical communication with the array of VCSELs, to injection lock the array of VCSELs.

9. The optical neural network of claim 1, wherein the diffractive optical element is a first diffractive optical element, and further comprising:
a second diffractive optical element, in optical communication with one of the second VCSELs in the array of VCSELs, to fan out a second beam emitted by the one of the second VCSELs.

10. The optical neural network of claim 1, wherein the array of VCSELs, the diffractive optical element, and the array of photodetectors form one of a sequence of photonic tensor cores in the optical neural network.

11. The optical neural network of claim 10, further comprising:
an analog-to-digital converter (ADC), operably coupled to the array of photodetectors, to convert analog outputs of the array of photodetectors into serialized digital values;
a memory, operably coupled to the ADC, to store the serialized digital values; and
a digital-to-analog converter (DAC), operably coupled to the memory, to convert the serialized digital values into an analog input suitable for driving a VCSEL in a subsequent photonic tensor core in the sequence of photonic tensor cores.

12. The optical neural network of claim 1, wherein the first VCSEL is configured to phase-modulate the first beam with the activation vector using phase shift keying.

13. The optical neural network of claim 1, wherein the array of VCSELs is configured to phase-modulate the first beam and the second beams using thermo-optic modulation.

14. The optical neural network of claim 1, wherein the array of VCSELs is configured to phase-modulate the first beam and the second beams using free-carrier injection.

15. The optical neural network of claim 1, wherein the array of photodetectors is configured as an array of balanced homodyne receivers.

16. The optical neural network of claim 1, further comprising:
driver circuitry electrically and physically coupled to the array of VCSELs;
a first layer of transparent polymer bonding the array of VCSELs to the diffractive optical element; and
a second layer of transparent polymer bonding the diffractive optical element to the array of photodetectors.

17. An optical neural network comprising:
an array of vertical-cavity surface-emitting lasers (VCSELs) comprising a first VCSEL to emit a first beam phase-modulated with an activation vector and second VCSELs to emit second beams phase-modulated with weights of a weight matrix of the optical neural network and coherent with the first beam;
a diffractive optical element, in optical communication with the first VCSEL, to fan out the first beam; and
an array of photodetectors, in optical communication with the array of VCSELs and the diffractive optical element, to detect interference between respective fanned-out copies of the first beam from the diffractive optical element and the second beams,
wherein the array of photodetectors is configured to generate outputs proportional to $$\sum_{t=1}^{k} \left[ W_j^i \sqrt{1 - (X^i)^2} - X^i \sqrt{1 - (W_j^i)^2} \right],$$

where $X^i$ represents the $i^{th}$ element of the activation vector and $W_j^i$ represents the $ij^{th}$ element of the weight matrix.

* * * * *